United States Patent [19]

Dumont

[11] 4,232,546
[45] Nov. 11, 1980

[54] METHOD AND APPARATUS FOR TUBE LEAKAGE TESTING

[75] Inventor: Willy Dumont, Nussbaumen, Switzerland

[73] Assignee: BBC Brown, Boveri & Company, Limited, Baden, Switzerland

[21] Appl. No.: 22,633

[22] Filed: Mar. 21, 1979

[30] Foreign Application Priority Data

Mar. 21, 1978 [CH] Switzerland ............................. 3060/78

[51] Int. Cl.³ ............................................. G01M 3/20
[52] U.S. Cl. ..................................................... 73/40.7
[58] Field of Search ..................... 73/40.7, 40.5 R, 1 R

[56] References Cited

U.S. PATENT DOCUMENTS

| | | | |
|---|---|---|---|
| 2,675,493 | 4/1954 | Grobel | 73/40.7 X |
| 3,425,264 | 2/1969 | Frei | 73/40.7 X |
| 3,803,900 | 4/1974 | Maillard | 73/40.7 X |
| 3,975,943 | 8/1976 | Brachet | 73/40.7 X |

FOREIGN PATENT DOCUMENTS 678544 1/1964 Canada ................................. 73/40.7

Primary Examiner—Gerald Goldberg
Assistant Examiner—Joseph W. Roskos
Attorney, Agent, or Firm—Burns, Doane, Swecker & Mathis

[57] ABSTRACT

A method and device for testing tube leakage, more particularly in a moisture-separator reheat superheater, to determine a tightness of separating walls between two flowing media which are separated from each other is disclosed. A test medium, e.g. an inert gas, such as helium, is introduced into a first medium whereby a lack of tightness in the separating walls can be quantitatively measured by a mass spectrometer in a sample taken from the second medium. In the event that the second medium consists of a number of phases, the nongaseous phases can be separated out by first condensing and, if necessary, by freezing the sample prior to testing. The test gas may furthermore be supplied to the second medium through a calibrated orifice to permit a determination of the extent of the tube leakage.

17 Claims, 2 Drawing Figures

METHOD AND APPARATUS FOR TUBE LEAKAGE TESTING

BACKGROUND AND SUMMARY OF THE PRESENT INVENTION

The present invention relates generally to tube leakage testing and more particularly relates to tube leakage testing in moisture-separator reheat superheaters.

In nuclear power plants having light water reactors, the steam after expansion in the high pressure turbine may contain about 10 to 15% moisture. Accordingly, so as to avoid blade erosion and efficiency losses, the steam must be dried following the expansion in the high pressure turbine and subsequently superheated with live steam. These two processes typically take place within a moisture-separator reheat superheater.

From the functional aspects, moisture-separator reheat superheaters are vital and (owing to their size) quite expensive components of the turbine plant. For this reason, test capabilities are usually provided so that damage, i.e., lack of tightness in the superheater tube bundle, can be recognized during operation. This damage is preferably discovered while in the initial stage in order to thereby avoid secondary damages.

A conventional test of today is the shutdown test method in which the moisture-separator reheat superheater in a shutdown plant is investigated for possible damage by hydraulic pressure testing and visual examination. In the event that leaky tubes are present, these tubes are mended, i.e., the tube is shut down while its ends are closed at the tube sheets.

In order to determine the presence of leak points without placing the entire plant or the suspected plant component out of operation, consideration has been given to a continuous testing by accounting for a material balance or by a comparison of superheater temperatures. Unfortunately, these methods have the disadvantage, however, that their results are typically load-dependent and are relatively inaccurate in spite of a very considerable expenditure. In addition, after a certain period of time and also after overhauls, deviations from the status of the component when new appear in the reading. Furthermore, it would be advantageous to be able to quickly ascertain damages which appear suddenly such as a complete tube fracture. Even here, however, it is necessary for a number of "complete tube fractures" to occur before a reliable indication is given.

A primary object of the present invention is to provide a method and device with which essentially greater indicator accuracies in a leak cross section ratio can be achieved than in accordance with the known methods and devices.

BRIEF DESCRIPTION OF THE DRAWINGS

A preferred embodiment of the device according to the present invention is described with reference to the accompanying drawings wherein like members bear like reference numbers and wherein.

DETAILED DESCRIPTION OF THE PREFERRED EMBODIMENT

With a device according to the present invention, it is possible to very quickly periodically check the status of plant components to be monitored. In this way, it is possible to achieve essentially greater accuracies in determining a leak cross section ratio, than with the known prior art continuous method. The test according to the present invention can be carried out without interrupting operation of the plant and provides an early warning of for example "complete tube fractures". At the same time, it is possible to use the presently-available reheat superheater temperature measurement as an additional continuous operational check.

Figure 1:
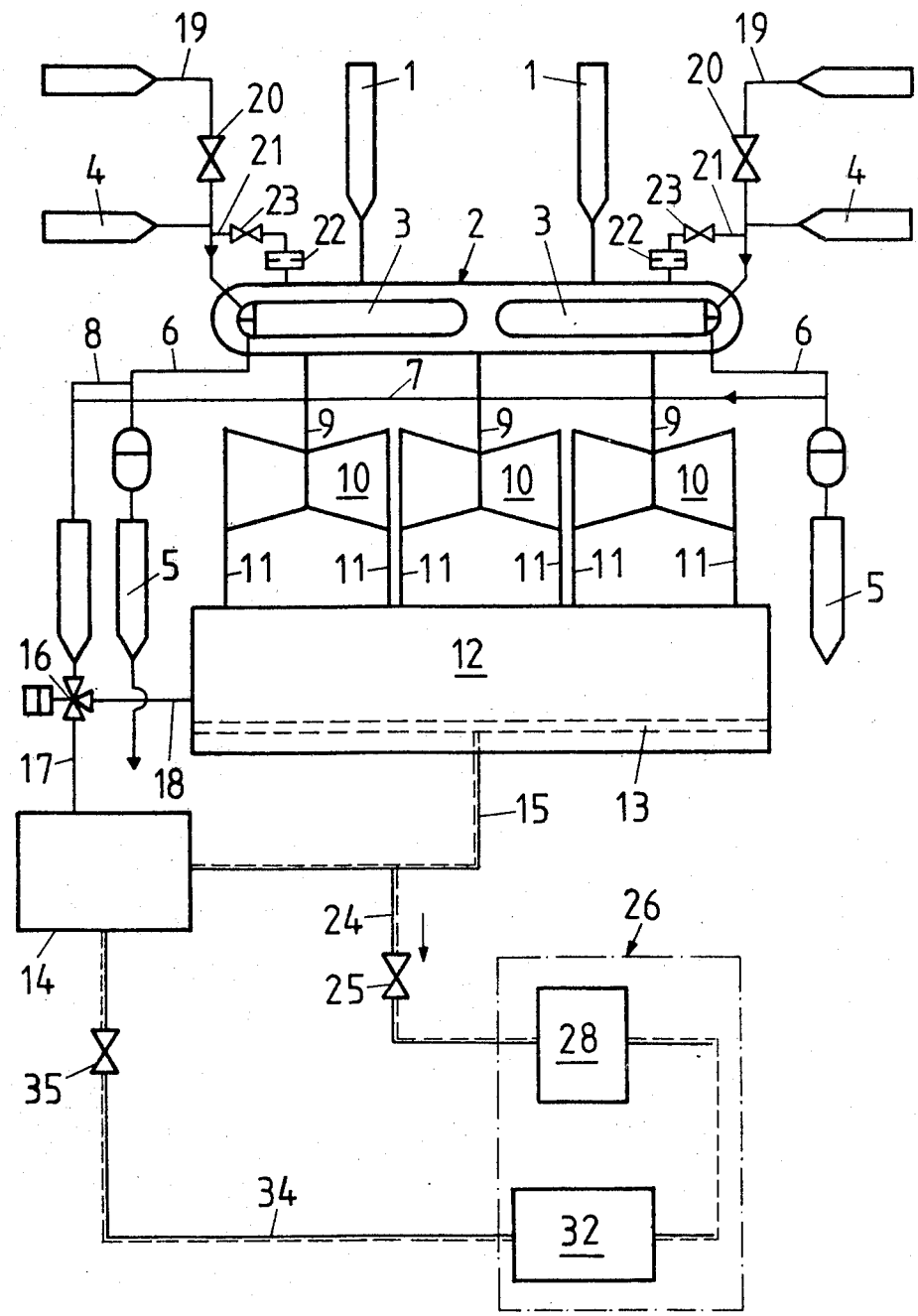
FIG. 1 is a schematic drawing of a moisture-separator reheat superheater having a device according to the present invention.

With reference now to FIG. 1, two lines 1 supply working steam from high pressure turbines of the plant. The working steam is passed into a moisture-separator reheat superheater 2 in which the steam is mechanically dried and superheated by a reheat superheater bundle 3. Of course, two bundles (as shown) or more may be provided as desired. The heating steam for accomplishing the superheating is delivered through two heating steam lines 4 with excess condensate being discharged through two condensate offtakes 5. Flushing steam which is tapped off from the hot steam line 4 is used for flushing out the condensate from the reheat superheaters. The flushing steam is then discharged with the condensate through lines 6, 7 and 8.

The superheated working steam passes from the moisture-separator reheat superheater 2 through lines 9 into three two-pass low pressure turbines 10 where the exhaust steam is expanded. The exhaust steam then passes through exhaust steam lines 11 into a condenser 12. In the condenser 12 a plurality of vent lines 13 (of which only a single one is shown in FIG. 1) are provided. An exhaust device 14 exhausts the gaseous and steam constituents of the condenser 12 through an exhaust line 15.

In the flushing steam line 8, an electromagnetically actuatable two-way valve 16 is provided. In this way, an intake of the flushing steam is possible either through a line 17 into the exhaust device 14 or through a line 18 into the condenser 12.

Figure 2:
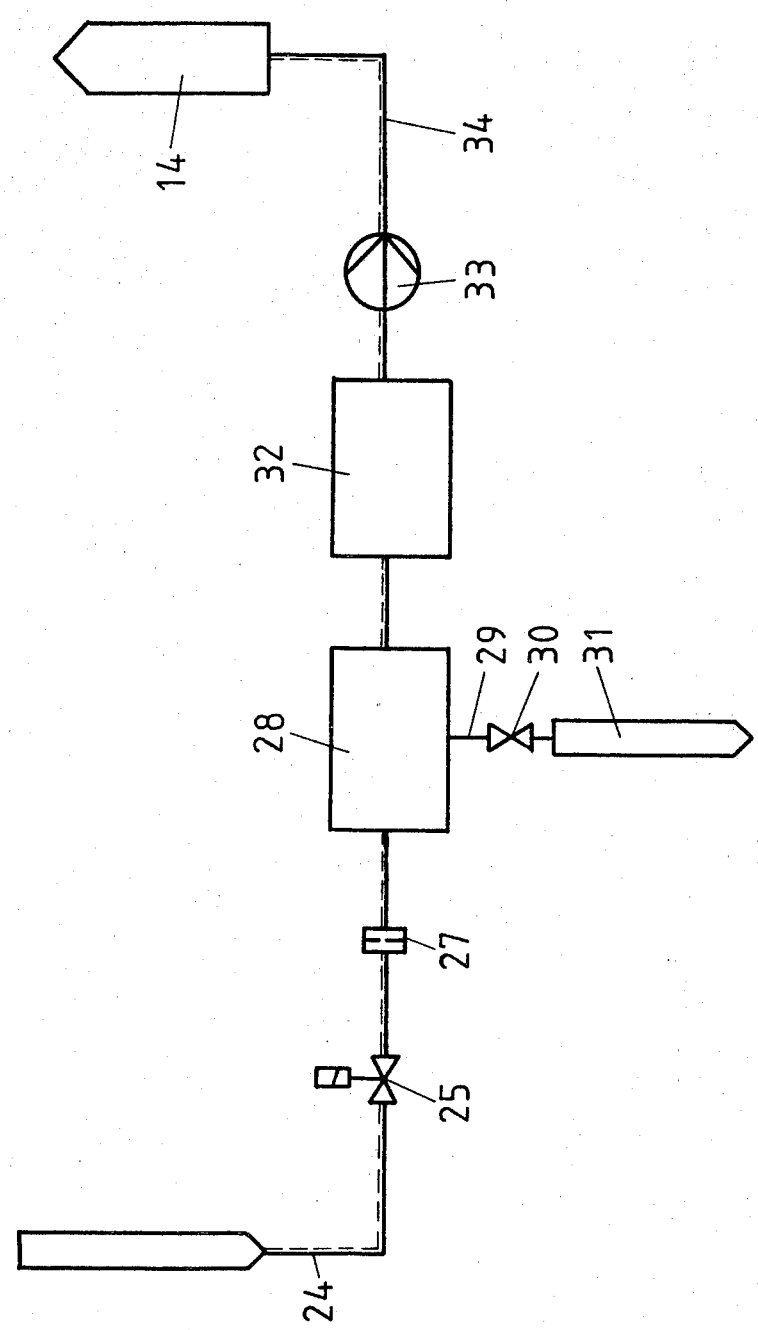
FIG. 2 is a schematic drawing of the device according to the present invention of FIG. 1.

With reference now to FIG. 2, the device for tube leakage testing will be described in detail. A pair of supply lines 19 are provided upstream from the moisture-separator reheat superheater to supply helium. Each of the lines 19 is provided with a valve 20 arranged upstream from an entry point of the lines 19 into the hot steam lines. A pair of tap lines 21 branch off from the hot steam lines 4 and are provided with calibrating apertures 22 and associated valves 23.

Downstream from the condenser and associated with the test device is a tap line 24 having a valve 25 through which a part of the gaseous condensate constituents are tapped off from the exhaust lines 15. In this way, the test may be carried out at periodic intervals. The part of the gaseous condensate constituents are supplied to the test apparatus (symbolized in FIG. 1 by block 26) whose individual components are schematically represented in FIG. 2.

An aperture 27 limits the tapped-off flow and is provided downstream of the check valve 25 at the intake of the test apparatus. The tapped-off gas-steam mixture then passes first into a cooler 28 in which the water component of the mixture is condensed out. This removal of water can, for example, take place in three stages whereby, in the last stage, the gas-steam mixture is cooled to below the freezing point in order to keep the residual content of water to the minimum. Under the cooler, a line 29, a drain valve 30 and a condensate collecting tank 31 are provided. After each test cycle, the frozen condensate located in the cooler is thawed out and drained into the collecting tank 31 through the line and the valve 30.

After condensing and freezing the gas stream mixture in the cooler 28, the noncondensible gases remain and are passed into a mass spectrometer 32 where the composition of the gases may be analyzed. After this analysis, the gases are delivered by a pump 33 through a line 34 and a valve 35 into the exhaust device 14 (see also FIG. 1).

During operation, a typical test cycle customarily only takes about a minute and proceeds as follows:

First of all, the delivery of flushing steam remaining from the heating steam into the condenser 12 is prevented by switching over valve 16. The flushing steam then passes through the line 17 directly into the exhaust device 14. Following this, by opening the valves 20, helium is introduced into the heating steam and is taken into the reheat superheater bundle 3 along with the steam. In the event that a leak is present in the bundle 3, it follows that helium in the working steam also travels with the escaping heating steam and thereby passes through the turbines 10 into the condenser 12. From the condenser 12, the steam and helium pass through the exhaust line 15, the tap line 24 and the valve 25 into the test apparatus 26. As already described above, the water component is separated in the cooler 28 by cooling and freezing. The helium component is then determined in the mass spectrometer 32. From this analysis, in the case of a known operating status of the plant (for a given quantity of heating steam and working steam), conclusions can be drawn as to the size of the leak.

For determining the particular size of the leak, the two calibrating apertures 22 which are normally blocked from the heating steam flow by the valves 23 are utilized. If both valves 20 (to supply helium) and the valves 23 are opened, both a specified component of the helium-heating steam mixture flowing through the aperture cross section and the secondary flow from a possible leakage enter into the working steam. The component of the overflowing helium can then be determined in the leak testing device in the way described above. By comparing these indications with the indications in the case of an actually appearing leak, it is possible to determine the general size of the leak cross section in the event that the cross section shape does not differ all too greatly from a circle. The calibrating apertures are accordingly to be considered as artificial leaks by which a determination can be made as to the extent of the actually occurring leakage.

For practical purposes, the method of approach can be such that the test is first carried out without use of the calibrating aperture, i.e., with valves 23 closed. If a leak is indicated in the test apparatus, the test is then repeated with open calibrating apertures in order to ascertain the size of the leakage.

If a leak is determined to be present during the test with the entire turbo unit, it follows that, to locate the leak, the test must first be repeated with each individual one of the moisture-separator reheat superheaters and afterwards with each individual bundle of a particular superheater.

At the same time, care should be taken that intervals are provided between the individual tests which are sufficiently long in order to guarantee a continuous removal of the helium gas which has passed into the circuit from the previous test.

If the leak rate proves to be inadmissibly high, it follows that the suspected plant component will be subjected to a shutdown check in which the leak points on the individual tube bundles are determined by a convention soap bubble test. The defective tubes may then be plugged as initially described.

Another inert gas can also be used instead of helium. In the case of boiling water reactors (BWR), the inert gas may nevertheless not be chemically changed owing to the effect of radiation appearing at this time.

The method and the device of the present invention may be utilized in an appropriately modified form in other plants in which the tightness of separating walls between two flowing fluids is to be monitored or ascertained as the case may be, for example in heat exchangers and other devices of industrial process engineering.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An apparatus for measuring leakage, in a heat exchanger, especially in a moisture-separator, reheat superheater, wherein a heat transmission takes place between a first and a second flowing media separated from one another by a dividing wall, comprising:
   first means for selectively supplying a test gas into the first flowing medium;
   means for obtaining a sample of the second flowing medium;
   means for removing non-gaseous components from the sample of the second flowing medium; and
   means for detecting the test gas in the sample of the second flowing medium.

2. The apparatus of claim 1 wherein the test gas is an inert gas.

3. The apparatus of claim 1 wherein the test gas is helium.

4. The apparatus of claim 1 further comprising
   second means for selectively supplying the test gas to the second flowing medium;
   control means for regulating said second means; and
   first aperture means for calibrating the supply of the test gas to the second flowing medium.

5. The apparatus of claim 4 wherein the control means includes a control valve and wherein the first aperture means includes a first calibrating aperture within a supply line for the test gas.

6. The apparatus of claims 1 or 5 further comprising:
   valve means for regulating a flow of the sample of the second flow media;
   second aperture means for calibrating said flow of the sample of the second flowing medium;
   both said second aperture means and said valve means being provided upstream of the means for removing non-gaseous components from the sample.

7. The apparatus of claim 1 wherein the means for removing non-gaseous components from the sample include a cooler having means for freezing the second medium, a drain valve and a condensate collecting tank.

8. The apparatus of claim 1 wherein the means for detecting the test gas includes a mass spectrometer.

9. The apparatus of claim 1 wherein each of the first and the second flowing media is steam.

10. A method for measuring leakage in a heat exchanger, especially in a moisture-separator, reheat superheater, wherein heat is transmitted between a first and a second flowing media separated from one another by a dividing wall, comprising the steps of:
   selectively supplying a test gas into the first flowing medium;
   obtaining a sample of the second flowing medium;
   removing non-gaseous components from the sample of the second flowing medium; and
   detecting the test gas in the sample of the second flowing medium.

11. The method of claim 10 wherein the test gas is helium.

12. The method of claim 10 wherein the test gas is an inert gas.

13. The method of claim 10 further comprising the step of:
   selectively supplying the test gas to the second flowing medium; and
   regulating said selective supply of the test gas to the second flowing medium by conducting the test gas through a first calibrating aperture.

14. The method of claims 10 or 13 further comprising the steps of:
   regulating a flow of the sample of the second flowing medium; and
   calibrating said flow of the sample of the second flowing medium by conducting the second flowing medium and the test gas through a second calibrating aperture.

15. The method of claim 10 wherein the non-gaseous components are removed from the sample by freezing; the method further comprising the step of:
   selectively draining a condensate from the second flowing medium into a condensate collecting tank.

16. The method of claim 10 wherein the test gas is detected in the sample of the second flowing medium by analyzing the sample in a mass spectrometer.

17. The method of claim 10 wherein each of the first and the second flowing media is steam.

* * * * *